United States Patent [19]

Ramlohr et al.

[11] Patent Number: 4,493,015
[45] Date of Patent: Jan. 8, 1985

[54] CIRCUIT ARRANGEMENT FOR DETERMINING THE LOAD CURRENT IN A REVERSIBLE D-C CONTROLLER OR CHOPPER

[75] Inventors: Franz Ramlohr; Wolfgang Spitaler, both of Vienna, Austria

[73] Assignee: Siemens Aktiengesellschaft, Berlin and Munich, Fed. Rep. of Germany

[21] Appl. No.: 449,833

[22] Filed: Dec. 14, 1982

[30] Foreign Application Priority Data

Dec. 21, 1981 [AT] Austria ................. 5487/81

[51] Int. Cl.$^3$ ........................ H02M 7/537
[52] U.S. Cl. ..................... 363/63; 318/341; 363/124
[58] Field of Search ........... 363/63, 98, 124, 132; 318/341, 344, 345 B

[56] References Cited

U.S. PATENT DOCUMENTS 3,806,787  4/1974  Erler ................... 318/341

FOREIGN PATENT DOCUMENTS 2729407  1/1979  Fed. Rep. of Germany ...... 318/341
58778   5/1981  Japan ........................ 363/98
157999  9/1978  Netherlands ................. 363/63

OTHER PUBLICATIONS

Leonov et al., "Reversible Transistor Converter for Controlling a DC Motor", Inst. & Exp. Tech. (USA) vol. 21, No. 5, PT. 2, pp. 1354–1357, (Sep.–Oct. 1978).
"Elektrie" 28, (1974), pp. 368–370, by M. Schulze, et al.

Primary Examiner—William H. Beha, Jr.
Attorney, Agent, or Firm—Kenyon & Kenyon

[57] ABSTRACT

In a reversible d-c controller, a current transformer having two primary windings as current measuring sensors is provided for determining the load current. The primary windings are connected with opposite winding sense into two diagonally disposed bridge arms of a controller bridge circuit. The secondary winding of the current transformer is coupled through a full wave rectifier and across a load resistor to the input of a sample-and-hold stage which is provided with an electronic sampling switch and at the output of which a signal proportional to the actual value of the load current is present. The bridge circuit comprises 4 bridge arms, each bridge arm having an electronic switch and a reverse biased diode shunted across the switch. Each pair of bridge arms connected to the same side of the power supply buss and coupled across the load form a bypass circuit. In order to evaluate the load current, the sampling switch is closed for a predetermined time whenever the load current circulates in a bypass circuit.

5 Claims, 4 Drawing Figures

CIRCUIT ARRANGEMENT FOR DETERMINING THE LOAD CURRENT IN A REVERSIBLE D-C CONTROLLER OR CHOPPER

BACKGROUND OF THE INVENTION

The present invention relates to a circuit arrangement for determining the load current in a reversible d-c controller or chopper having a bridge circuit connected across a supply voltage source, the bridge circuit comprising four bridge arms, each of which includes an antiparallel circuit comprising an electronic switch and a bypass diode, the bridge circuit further including a measuring sensor provided in two of the bridge arms.

Such a circuit arrangement is known, for instance, from the journal "Elektrie" 28 (1974), pages 368 to 370. In the known circuit arrangement resistors are provided as measuring sensors in the two bridge arms which are connected to the bus at reference potential. Although this circuit arrangement allows the load current to be determined at zero potential, elaborate and expensive electronic circuitry is required for its evaluation. An object of the invention is to provide a circuit arrangement of the type mentioned above by which the load current can be determined in a relatively simple and convenient manner. A further object is to provide such a circuit arrangement in which the load current is determined at zero potential, that is, in a circuit isolated from the d-c supply buss.

SUMMARY OF THE INVENTION

These and other objects of the invention are achieved by providing a circuit arrangement including a current transformer having two primary windings as the measuring sensors in the bridge circuit, each primary winding of which is respectively connected in the opposite winding sense in two diagonally disposed bridge-arms of the bridge circuit. The secondary winding of the current transformer is connected via a rectifier circuit and a load resistor to the input of a sample-and-hold stage which is provided with an electronic sampling switch and at the output of which a voltage proportional to the actual load current value is present. The sampling switch is closed via digital logic circuitry in dependence on the driving control signal for the electronic switches of two bridge arms connected to the same bus during a predetermined time in each time interval in which the load current circulates through a bypass diode. During pauses in the chopper drive, voltages induced across the inductive load circulate through a pair of bridge arms which are connected to the same side of the d-c supply voltage source. Each pair of the bridge arms connected to the same side of the d-c supply form what is called a bypass circuit.

In the circuit arrangement according to the invention, the load current is not determined during an operating state when energy is fed into the load or fed back from the load, which may be, for instance, a d-c motor or generator. In an operating state, the load current flows through two of the diagonally disposed bridge arms. The load current is not determined during this switching state because there is no magnetization of the transformer core, because either the current does not flow through the two primary windings, or both primary windings of the core are magnetized equally and oppositely, so that the resultant core magnetization is likewise zero. If, however, the load current circulates during a pause in the chopper drive in one of the bypass circuits, it flows in only one of the primary windings of the current transformer, which then causes the transformer core to be magnetized. This results in a pulse-like signal rise in the secondary winding. The determination and evaluation of the load current then takes place in the sample-and-hold stage. Such sample-and-hold stages, also called instantaneous-value memories, are known, for instance, from the book "Halbleiter-schaltungstechnik" (semiconductor circuit design) Springer Verlag 1974, pages 295 to 296. In order to evaluate the load current, the electronic sampling switch is closed at an instant when the narrow pulses present at the secondary winding are representative of the load current. Inexpensive a-c transformers can be used in this circuit arrangement. The load current is determined at zero potential since the measuring circuit is d-c separated from the power circuit via the current transformer. Additionally, continuous measurement and determination of the load current is made during the pauses in the drive of the reversible d-c controller.

BRIEF DESCRIPTION OF THE DRAWINGS

The invention will be explained in greater detail in the following detailed description by way of example, referring to the drawings, in which.

DETAILED DESCRIPTION

Figure 1:
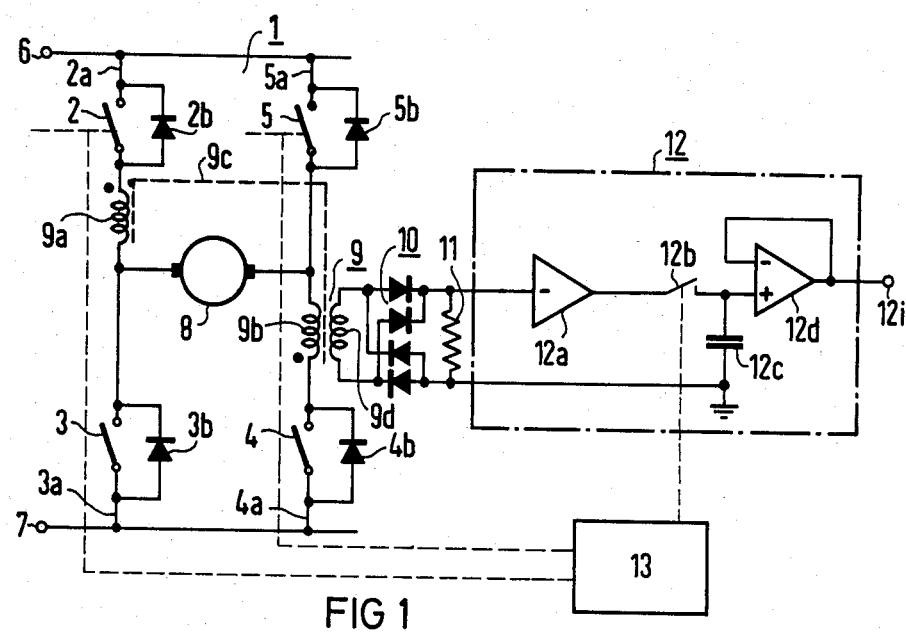
FIG. 1 is a schematic/block diagram of the circuit arrangement of the invention.

With reference to the drawings, FIG. 1 illustrates the design of the circuit arrangement according to the invention. In the power section 1 of the reversible d-c controller or chopper, four electronic switches 2, 3, 4 and 5 are arranged in a bridge circuit with bridge arms 2a, 3a, 4a and 5a between two input busses 6 and 7, to which the d-c supply voltage is applied. The electronic switches 2, 3, 4 and 5 may, for instance, be transistors. Each of the electronic switches 2, 3, 4 and 5 is shunted by a bypass diode 2b, 3b, 4b or 5b, respectively, to form an antiparallel circuit, i.e., the diodes are polarized opposite the forward direction of the corresponding electronic switch. A d-c motor 8 is connected as the load in the bridge circuit between the junction point of the electronic switches 2 and 3 and the junction point of the electronic switches 4 and 5. The bridge arms 2a and 5a form a first bypass circuit and the bridge arms 3a and 4a form a second bypass circuit.

In order to determine the load current, a current transformer 9 with two primary windings 9a and 9b, a common core 9c and a secondary winding 9d is provided in the circuit arrangement. The two primary windings 9a and 9b are connected in diagonal bridge arms 2a and 4a with opposite winding sense. The secondary winding 9d of the current transformer 9 is coupled via full wave rectifier circuit 10 and load resistor 11 to the inputs of sample-and-hold stage 12. In the schematically shown sample-and-hold stage 12, an inverting operational amplifier 12a is followed by an electronic sampling switch 12b which may be, for example, an FET switch. The sampling switch 12b is coupled to storage capacitor 12c and the non-inverting input of a second operational amplifier 12d connected as an impedance matching stage, the output 12i of which is connected to the inverting input. A voltage proportional to the magnitude of the actual load current value is present at the output 12i of operational amplifier 12d. The sampling switch 12b is controlled by logic circuit 13 to which are fed the control pulses S2 and S5 of electronic switches 2 and 5. The logic circuit 13 which comprises digital logic member and time delay stages, will be discussed in further detail below, with reference to FIG. 2.

In order to explain the operation of the circuit arrangement according to FIG. 1, it must be assumed that the switches 2 and 3 as well as 4 and 5 can never be on at the same time, because otherwise short circuits would occur across the d-c buss. If energy is fed-in, or, if the motor 8 is operated as a generator, fed back, the current always flows via the switches 2 and 4 or 5 and 3 in the diagonal bridge arms or via the corresponding bypass diodes 2b and 4b or 5b and 3b. In this mode of operation, the transformer core 9c is not magnetized, since either no current flows through both primary windings when the current flows through the closed switches 3 and 5, or if the current flows through the closed switches 2 and 4, both primary windings magnetize the core equally and oppositely, so that the resultant core magnetization is likewise zero. If it is assumed, for instance, that the switches 2 and 4 were closed and one of these switches is opened to initiate a pause, a current caused by the motor inductance is driven in the corresponding bypass circuit via a bypass diode and a switch and one of the primary windings 9a or 9b. This current causes the transformer core 9c to be magnetized, which in turn causes a pulse-like current rise in the secondary coil 9d. Depending on the driving control signals of the electronic switches 2 and 5, the evaluation switch 12b of the sample-and-hold stage 12 is closed at the proper time by the logic circuit 13 whenever the load current circulates in either the two bypass circuits. The time interval during which the sampling switch 12b is closed is predetermined by time delay stages and set so that the evaluation takes place at an instant when the narrow current pulse at the secondary winding 9d of the current transformer 9 is representative of the load current. At the outputs of the sample-and-hold stage, a voltage value is therefore present which corresponds to the magnitude of the motor current.

Figure 2:
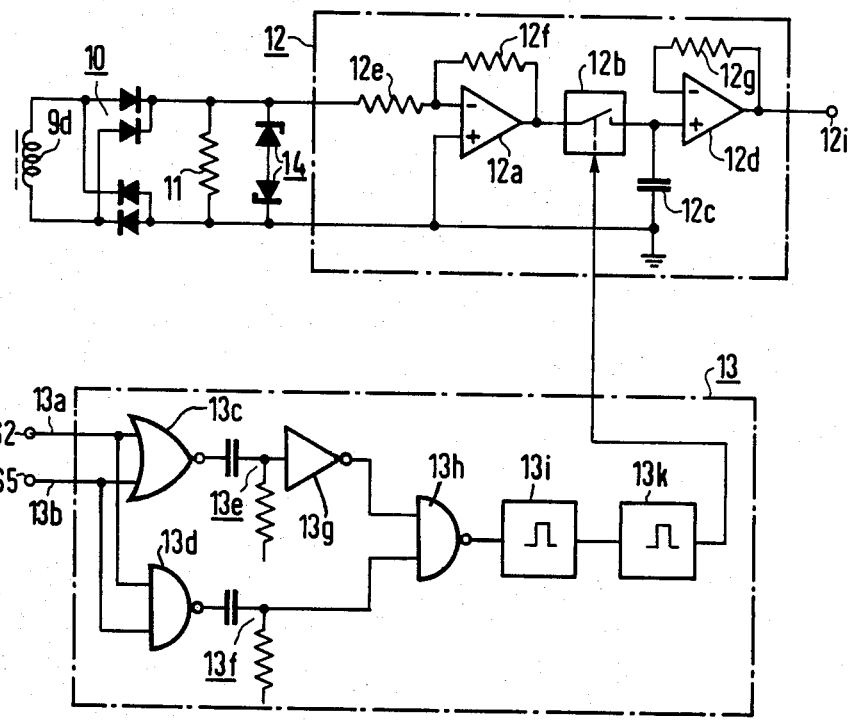
FIG. 2 is a schematic/block diagram illustrating a further embodiment of the invention and showing parts of FIG. 1 in greater detail.

FIG. 2 shows a detailed embodiment of the evaluation circuit and the logic circuit 13. The secondary winding 9d of the current transformer 9 is fed via bridge rectifier 10 and load resistor 11 to the input of the sample-and-hold stage 12. Oppositely polarized series-connected limiting zener diodes 14 are connected across resistor 11. The input of the sample-and-hold stage 12 is connected via a resistor 12e to the inverting input of the first operational amplifier 12a, the output of which is connected via the resistor 12f to the inverting input and the non-inverting input of which is at reference potential. Operational amplifier 12a thus operates as an inverting amplifier. The output of the operational amplifier 12a is coupled to evaluation switch 12b, to the output of which the storage capacitor 12c and the non-inverting input of the impedance matching stage 12d are connected.

Control circuit 13 may now be described. Control signals S2 and S5 of electronic switches 2 and 5 are present at the inputs 13a and 13b of logic circuit 13 and are connected to the inputs of NOR gate 13c and NAND gate 13d. The output of NOR gate 13c is followed by R-C differentiating stage 13e, which is coupled to the input of inverter 13g, the output of which is coupled to the input of a further NAND gate 13h. To the output of NAND gate 13d is connected a second R-C differentiating stage 13f, which is coupled to the secoond input of NAND gate 13h. Two time delay stages 13i and 13k which might comprise monostable multivibrators or single shots are series connected to the output of NAND gate 13h. The output of time delay stage 13k is coupled to the control input of electronic switch 12b. The delay stages 13i and 13k are triggered by the leading edge of the pulse present at the output of NAND gate 13h, and deliver a delayed pulse of predetermined width, whereby the sampling time of the sample-and-hold stage 12 is set during each bypass period. The operation of the logic circuit will be explained in further detail below, making reference to FIGS. 3 and 4.

Figure 3:
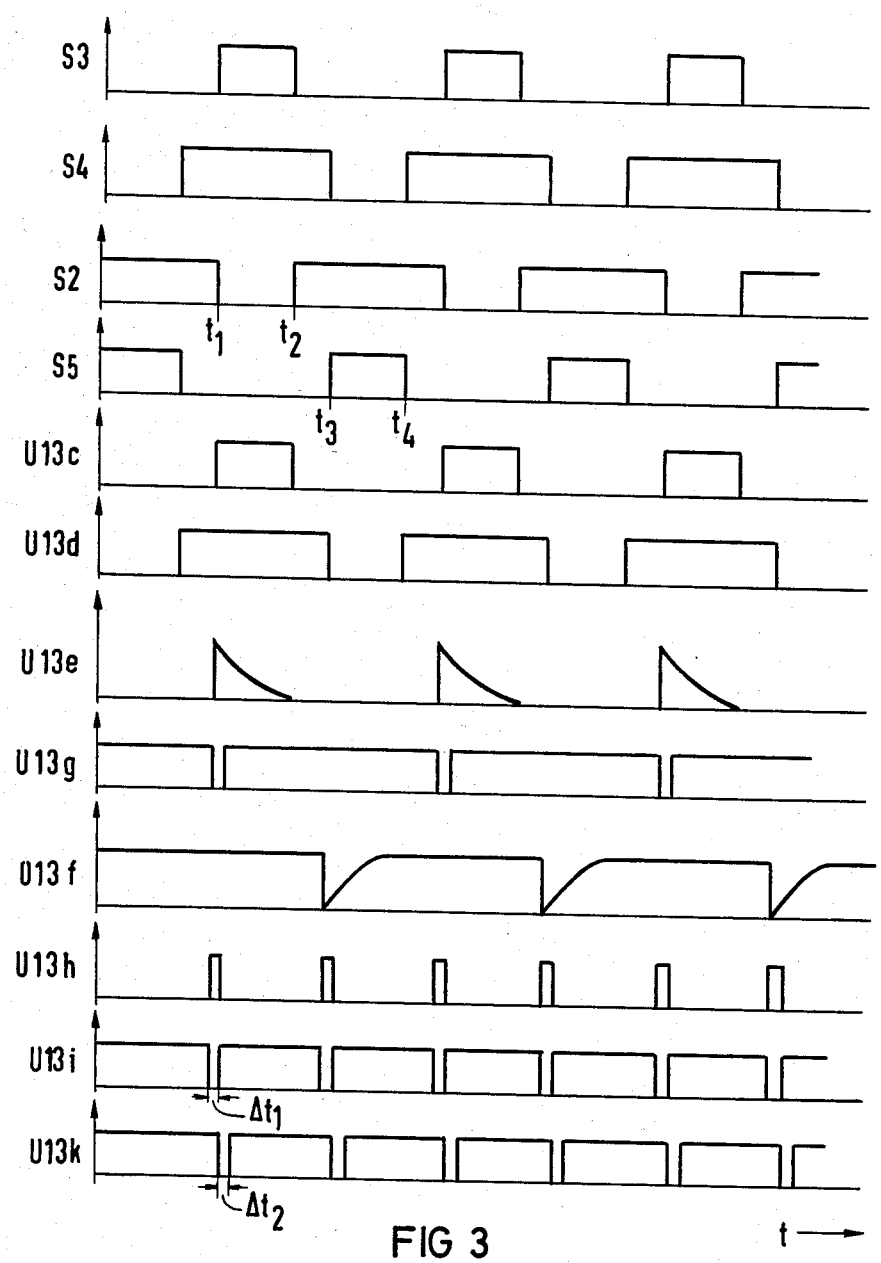
FIG. 3 is a timing diagram showing the signals present in the circuit of FIG. 2.
Figure 4:
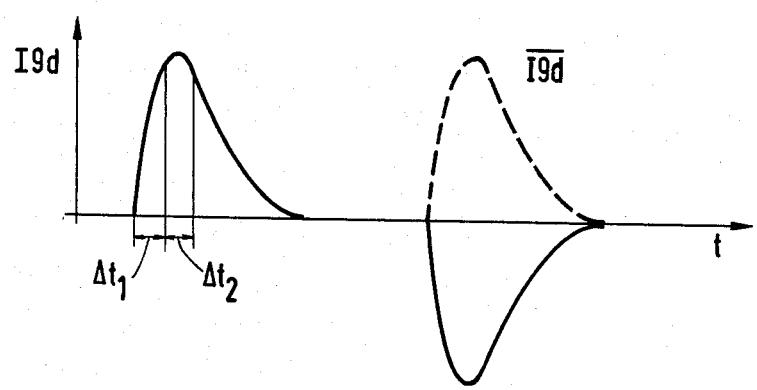
FIG. 4 is a further timing diagram showing signals present across the secondary winding of the current transformer of FIG. 2.

In FIG. 3, the control signal S2, S3, S4 and S5 of the electronic switches 2, 3, 4 and 5 and the respective output signals of NOR gate 13c, NAND gate 13d, differentiating stages 13e and 13f, inverter stage 13g, NAND gate 13h and delay stages 13i and 3k are plotted versus time t. FIG. 4 shows the current pulse waveforms J9d induced in the secondary winding 9d when the load current circulates in the bypass circuits, the rectified signal being shown by the dashed curve.

In the following, it is assumed that the control signals S2 and S5 open the corresponding electronic switch 2 or 5, respectively, in the state "1" and close it in the state "0". From the time $t_1$ to the time $t_2$, the load current therefore circulates, according to the timing diagram of FIG. 3, in the first bypass circuit through bypass diode 2b and switch 5. From the time $t_2$ to the time $t_3$, the load current flows via the closed switches 3 and 5. From the time $t_3$ to the time $t_4$, on the other hand, the load current circulates in the second bypass circuit via switch 3 and bypass diode 4b. At the leading edge of each pulse at the output of NOR gate 13c one obtains at the output of differentiating stage 13e the signal U13e which is inverted by inverter 13g and generates at the output of NAND gate 13h the pulse U13h. The leading edge of pulses U13h triggers the first delay stage 13i to deliver a pulse U13i of length $\Delta t_1$, which in turn triggers delay stage 13k at the trailing edge to generate a pulse with length $\Delta t_2$, which pulse closes the sampling switch 12b. The length $\Delta t_1$ of the pulse U13i is matched, as shown in FIG. 4, to the rising edge of the voltage pulse U9d, and the length $\Delta t_2$ of the pulse U13k is predetermined by a range in which the maximum of the voltage pulse U9d is located. Both pulse lengths $\Delta t_1$ and $\Delta t_2$ are several msec. long. It is thereby ensured that in the time interval $\Delta t_2$ a value representing the magnitude of the actual value of the load current is read into the storage capacitor 12c of the sample-and-hold stage 12 and is present at its output 12i. Similarly, a differentiated pulse U13f is obtained at the trailing edge of the pulse U13d, which analogously triggers a pulse U13k by which the switch 12 is likewise closed for the time interval $\Delta t_2$. Thus, when current circulates in either bypass circuit, the current value is sampled and held in sample and hold stage 12.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In a circuit arrangement for determining the polarity of the load current in a reversible d-c controller having a bridge circuit which is connected across a d-c supply voltage source, said bridge circuit having four bridge arms, respective pairs of said bridge arms diagonally disposed in said bridge circuit, load current flowing to or from the d-c supply voltage source through the diagonally disposed bridge arms, each of said bridge arms including an antiparallel circuit comprising first electronic switch means and bypass diode means wherein two pairs of bridge arms respectively connected to the same bus of said supply voltage source each form a bypass circuit in which a measuring sensor is provided, the improvement comprising:

a current transformer having a secondary winding and having two primary windings provided as measuring sensors, said primary windings connected in opposite winding sense in respective ones of said bypass circuits in two of said diagonally disposed bridge arms;

rectifier means coupled to the secondary winding of said current transformer;

sample-and-hold means having an input coupled to said rectifier means, said sample-and-hold means including electronic sampling switch means;

digital logic means coupled to said first electronic switch means so that said sampling switch means causes said sample-and-hold means to sample the signal present at the input of said sample-and-hold means during a predetermined time in each time interval in which the load current circulates in either of the bypass circuits whereby a signal proportional to the actual value of the load current is formed at the output of said sample-and-hold means.

2. The improvement recited in claim 1, further comprising a load resistor disposed across the output of said rectifier means.

3. The improvement recited in claim 2 wherein said rectifier means comprises a full wave rectifier bridge and further comprising zener diode limiting means disposed across said load resistor.

4. The improvement recited in claim 1 wherein said sample-and-hold means comprises operational amplifier means.

5. The improvement recited in claim 1 wherein said digital logic means has inputs coupled to both said first electronic switch means disposed in one of said bypass circuits.

* * * * *